United States Patent [19]

Jones et al.

[11] Patent Number: 5,548,783

[45] Date of Patent: Aug. 20, 1996

[54] COMPOSITE DRIVE CONTROLLER INCLUDING COMPOSITE DISK DRIVER FOR SUPPORTING COMPOSITE DRIVE ACCESSES AND A PASS-THROUGH DRIVER FOR SUPPORTING ACCESSES TO STAND-ALONE SCSI PERIPHERALS

[75] Inventors: Craig S. Jones; Alan Davis, both of Austin, Tex.

[73] Assignee: Dell USA, L.P., Austin, Tex.

[21] Appl. No.: 145,008

[22] Filed: Oct. 28, 1993

[51] Int. Cl.⁶ .............................. G06F 11/16; G06F 15/16
[52] U.S. Cl. ......................... 395/836; 395/500; 395/835; 364/236.2; 364/268.3; 364/944.2; 364/944.7
[58] Field of Search ..................................... 395/275, 500, 395/835, 836

[56] References Cited

U.S. PATENT DOCUMENTS

| | | | |
|---|---|---|---|
| 4,453,211 | 6/1984 | Askinazi et al. | 364/200 |
| 5,278,973 | 1/1994 | O'Brien et al. | 395/500 |
| 5,335,326 | 8/1994 | Nguyen et al. | 395/250 |
| 5,404,462 | 4/1995 | Datwyler et al. | 395/325 |

*Primary Examiner*—Thomas C. Lee
*Assistant Examiner*—Rehana Perveen Krick
*Attorney, Agent, or Firm*—Henry N. Garrana; Mark P. Kahler; Michelle M. Turner

[57] ABSTRACT

A drive array controller is provided that serves as an interface between both stand-alone SCSI devices as well as SCSI devices that form a composite drive. Since an AHA emulation interface is incorporated on the drive array controller, the drive array controller is compatible with conventional AHA device drivers that drive stand-alone peripheral devices such as SCSI CD-ROM units and SCSI tape drives. The drive array controller includes a SCSI pass-through driver that extracts a SCSI command descriptor block from a command control block created by the AHA device driver. The drive array controller further provides a separate peripheral access channel to support high speed composite drive operations through a composite device driver. Since the AHA emulation interface and a composite drive interface are provided on a common peripheral board, only one EISA expansion slot is occupied.

14 Claims, 6 Drawing Sheets

| Byte 0 | Command Control Block Cascade | | | |
|---|---|---|---|---|
| +1 | Tar/Init | Data Out | Data In | LUN |
| +2 | SCSI Command Length = m | | | |
| +3 | Returned Sense Into Length = n | | | |
| +4 | Data Length (MSB,MID,LSB) | | | |
| +7 | Data Pointer (MSB,MID,LSB) | | | |
| +10 | Link Pointer (MSB,MID,LSB) | | | |
| +13 | Command Link ID | | | |
| +14 | Host Status | | | |
| +15 | Target Status | | | |
| +16 | Reserved | | | |
| +17 | Reserved | | | |
| +18 | SCSI Command Bytes (m Bytes) (CDB) —201 | | | |
| 18 + m | Allocated for Sense Data (m Bytes) | | | |

| BIT BYTE | 7 | 6 | 5 | 4 | 3 | 2 | 1 | 0 |
|---|---|---|---|---|---|---|---|---|
| 0 | Operation Code | | | | | | | |
| 1 | LUN | | | Logical Block Address (MSB) | | | | |
| 2 | Logical Block Address | | | | | | | |
| 3 | Logical Block Address (LSB) | | | | | | | |
| 4 | Transfer Length | | | | | | | |
| 5 | Vendor Unique | | | Reserved | | | Flag | Linx |

COMPOSITE DRIVE CONTROLLER INCLUDING COMPOSITE DISK DRIVER FOR SUPPORTING COMPOSITE DRIVE ACCESSES AND A PASS-THROUGH DRIVER FOR SUPPORTING ACCESSES TO STAND-ALONE SCSI PERIPHERALS

BACKGROUND OF THE INVENTION

1. Field of the Invention

This invention relates to peripheral controllers for computer systems and, more particularly, to a composite drive controller for controlling an array of disk drives and including a SCSI pass-through mechanism for controlling standard SCSI peripherals.

2. Description of the Relevant Art

During the past several years, a new trend in mass storage subsystems has emerged for improving the performance, capacity, cost, and reliability associated with the storage of data. This trend involves an increase in the use of what are typically referred to as disk array subsystems.

Generally speaking, a disk array subsystem includes an array of standard hard disk drives coupled in parallel, referred to collectively as a "composite" drive. The disk array subsystem further includes a drive array controller for interfacing the composite drive to a computer system. The drive array controller, which is generally installable on an expansion bus of the computer system, performs an address translation function and converts input-output ("I/O") read and write requests into a sequence of seeks, delays or other disk commands to read data from or write data to the composite drive.

A drive array controller differs from a conventional disk drive controller (i.e., a single disk controller) in that, with respect to the drive array controller, the set of disk drives coupled thereto emulate a single disk drive having a greater capacity and a higher performance than any individual disk drive included as a portion thereof. To perform an access to a "composite" location within the composite drive, the drive array controller must be cognizant of both the position of the particular disk drive to be accessed as well as the physical sector location of that disk drive which corresponds to the composite location for which access is sought. Various hardware and software implementations are well-known for performing these functions.

To implement a drive array subsystem within, for example, an exemplary 80386 or 80486 microprocessor-based computer system, a drive array controller card is typically provided that is installable on one of the expansion slots of the host system. The drive array controller card provides an interface between the expansion bus and a collection of hard drives that form the composite drive. Exemplary expansion bus standards include the ISA (Industry Standard Architecture) bus and the EISA (Extended Industry Standard Architecture) bus.

In addition to performing the composite address-to-physical address translation, the drive array controller may also perform a variety of additional tasks. For example, the drive array controller may perform data redundancy tasks such as data mirroring or data guarding. Exemplary data mirroring and data guarding techniques are described in a variety of publications of the known prior art, including the articles: "Introduction to Redundant Arrays of Inexpensive Disks (RAID)" by D. Patterson, P. Chen, G. Gibson and R. Katz, IEEE, 1989; "Coding Techniques for Handling Failures in Large Disk Arrays" by G. Gibson, L. Hellerstein, R. Karp, R. Katz and D. Patterson, Report No. UCB/CSD 88/477, December 1988, Computer Science Division, University of California Berkeley; and "A Case Study for Redundant Arrays of Inexpensive Disks (RAID)" by D. Patterson, G. Gibson, and R. Katz, presented at the June 1988 ACM SIGMOD Conference in Chicago, Ill.

A popular interface bus for coupling peripheral devices in general to a host computer is the Small Computer System Interface (SCSI) bus. A single SCSI bus can accommodate up to eight different peripheral devices. The SCSI standard involves a set of pre-specified bus signals and command definitions that support communications with a number of different types of peripheral devices.

A variety of peripherals such as hard drives, floppy drives, CD-ROM units, tape drives and printers have been developed that are directly connectable to the SCSI bus. Such "intelligent" SCSI peripherals include interface electronics adapted to receive a SCSI command packet from the SCSI bus which contains the information needed to perform a desired operation. In a typical system the SCSI peripheral is connected to a "host adapter" that provides an interface between the expansion bus of the host computer and the SCSI bus.

One prevalent host adapter that provides an interface between the ISA expansion bus and the SCSI bus is the AHA-1540 (and AHA-1542) Intelligent Host Adapter manufactured by Adaptec, Inc. of Milpitas, Calif.. The AHA-1540 is commonly employed within, for example, 80386 and 80486 microprocessor-based computer systems to couple stand-alone SCSI hard drives, SCSI floppy drives, SCSI CD-ROM units and SCSI tape drives to an internal ISA expansion slot of the host computer.

If a user desires to incorporate within a particular computer system both a composite drive and stand-alone SCSI devices such as CD-ROM units and tape drives, both a drive array controller card and a host adapter card such as the AHA-1540 are typically utilized. The drive array controller card and the host adapter card are plugged into separate EISA slots of the computer system and provide respective interfaces to the composite drive and the stand-alone SCSI devices. Unfortunately, the occupation of two EISA expansion slots limits further system expansion due to the small overall number of EISA slots available in a typical system. This is a particular problem for fileserver systems since they often require many network interface cards and/or serial port cards.

SUMMARY OF THE INVENTION

The problems outlined above are in large part solved by a drive array controller with a SCSI pass-through mechanism according to the present invention. The drive array controller provides an interface between both stand-alone SCSI devices as well as SCSI devices that form a composite drive. Since an AHA emulation interface is provided, the drive array controller is compatible with conventional AHA device drivers that drive stand-alone peripheral devices such as SCSI CD-ROMs and SCSI tape drives. The drive array controller further provides a separate peripheral access channel to support high speed composite drive operation through a composite device driver. Since both an AHA emulation interface and a composite drive interface are provided on a common peripheral board, only one EISA expansion slot is occupied.

In one embodiment, the drive array controller includes a composite drive "native" interface for receiving composite drive access commands from a composite device driver of a host computer system. The composite drive access commands, which are in a non-SCSI format, includes a composite drive address that is translated to a physical drive address by a composite disk driver. A physical command control block is then provided to a SCSI device driver which creates a SCSI command descriptor block and provides the SCSI command descriptor block to a target SCSI device. The drive array controller further includes an AHA emulation interface adapted to receive a command control block from an AHA device driver. The command control block includes a standard SCSI formatted command descriptor block embedded therein. If the command control block corresponds to a stand-alone SCSI device such as a tape drive or a CD-ROM, the SCSI command descriptor block is extracted from the command control block by a SCSI pass-through driver. The SCSI command descriptor block is then provided directly to the SCSI device driver which provides the SCSI command descriptor block to the targeted SCSI peripheral device.

Broadly speaking, the present invention contemplates a method for interfacing a plurality of SCSI devices to a host computer system comprising the steps of receiving a peripheral access request having a SCSI command descriptor block embedded therein at a first request interface, extracting the SCSI command descriptor block from the peripheral access request, and providing the SCSI command descriptor block to a SCSI bus. The method comprises the further steps of receiving a non-SCSI composite drive access request at a second request interface, translating a composite drive location indicated within the non-SCSI composite drive access request to a physical drive location to thereby create a physical drive command request, converting the physical drive command request to a second SCSI command descriptor block, and providing the second SCSI command descriptor block to the SCSI bus.

The present invention additionally contemplates a drive array controller connectable to a host computer, wherein the host computer includes a first device driver capable of generating a peripheral access request having a SCSI command descriptor block embedded therein and a second device diver capable of generating a non-SCSI composite drive access request. The drive array controller comprises a first request interface coupled to receive the peripheral access request from the first device driver and a pass-through driver coupled to the first request interface, wherein the pass-through driver is capable of extracting the SCSI command descriptor block from the peripheral access request. The drive array controller further comprises a second request interface coupled to receive the non-SCSI composite drive access request from the second device driver that is capable of generating a composite command block containing information for accessing a composite drive. A composite disk driver is coupled to the second request interface and is capable of translating a composite drive location indicated within the composite command block to a physical drive location. The composite disk driver is further capable of providing the physical drive location within a physical drive control block. The drive array controller finally includes a SCSI device driver coupled to receive the SCSI command descriptor block from the pass-through driver that is capable of providing the SCSI command descriptor block to a SCSI bus having a plurality of SCSI peripherals coupled thereto during a first mode. The SCSI device driver is further capable of deriving a separate SCSI command descriptor block from the physical drive control block and is capable of providing the separate SCSI command descriptor block to the SCSI bus during a second mode.

BRIEF DESCRIPTION OF THE DRAWINGS

Other objects and advantages of the invention will become apparent upon reading the following detailed description and upon reference to the accompanying drawings in which:

FIG. 2 is a diagram of a typical command control block.

FIG. 3 is a diagram of a SCSI command descriptor block.

Figure 1:
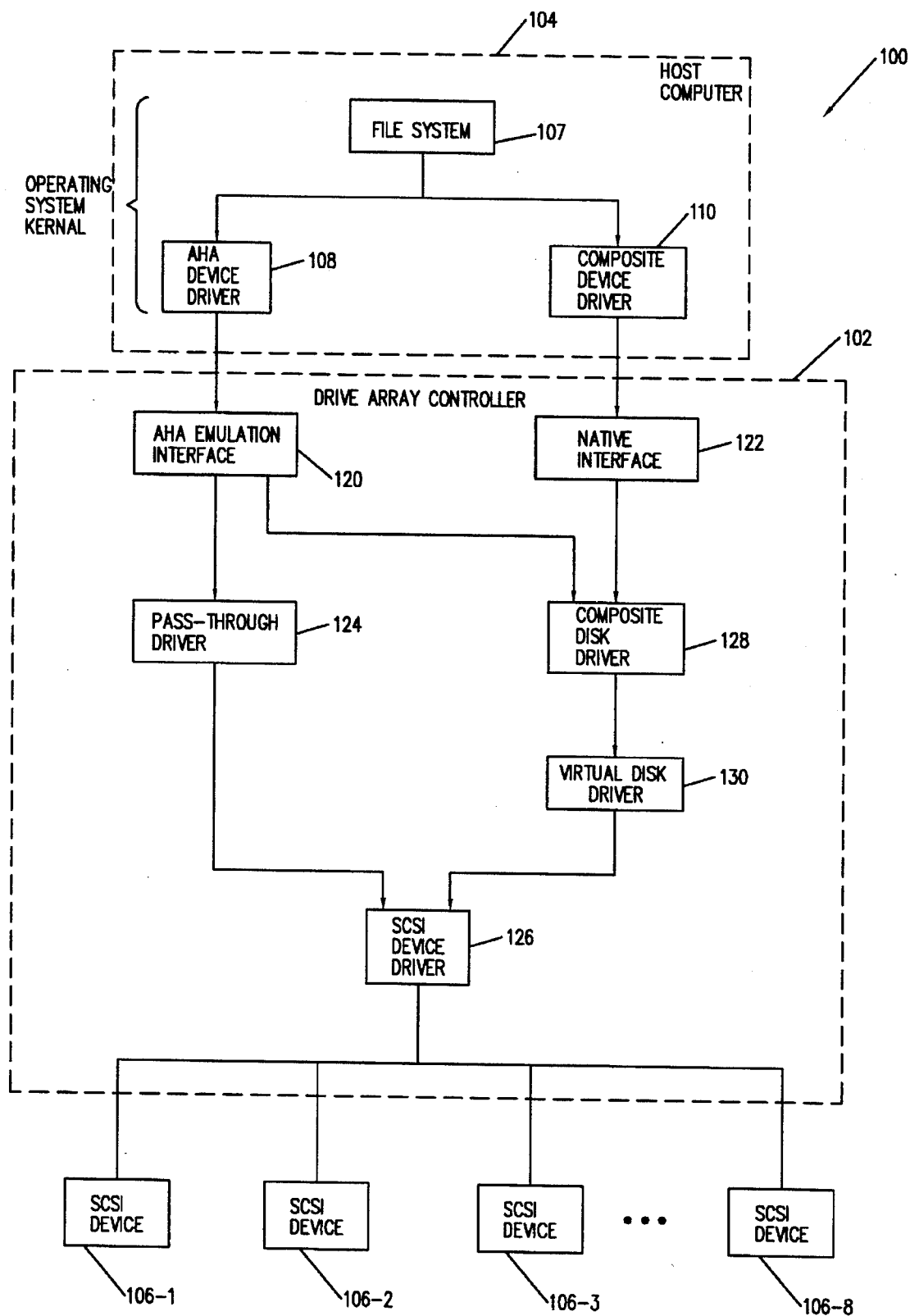
FIG. 1 is a functional block diagram of computer system including a drive array controller according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a functional block diagram is shown of a computer system 100 including a drive array controller 102 according to the present invention. The drive array controller 102 is shown functionally coupled between a host computer 104 and a plurality of SCSI peripheral devices 106-1 through 106-8.

Host computer 104 includes a filesystem 107 coupled to an AHA device driver 108 and to a composite device driver 110. As depicted therein, filesystem 107, AHA device driver 108 and composite device driver 110 are integral portions of an operating system kernel of the host computer 104. While the physical hardware and software portions of host computer 104 that form the constituent parts of filesystem 107, AHA device driver 108, and composite device driver 110 are in general well known to those of skill in the art, a summary of each depicted sub-block of host computer 104 will be provided below.

Filesystem 107 is a central resource of the host computer's operating system which manages, among other things, the allocated memory space for user program files, boot and self-test subroutines, and I/O device drivers. Popular operating systems such as DOS, UNIX, Novell Netware, OS/2 and Windows NT each include exemplary filesystems that conform generally to the filesystem 107 as depicted in FIG. 1.

AHA device driver 108 is a portion of the operating system kernel that creates device-specific I/O access requests in the form of command structures referred to as command control blocks. In this embodiment, a command control block as created by AHA device driver 108 is adapted to drive, for example, an Adaptec AHA-1540 host adapter card. The AHA device driver 108 creates the command control block in response to a generic (i.e., non-device specific) I/O access request issued by filesystem 107. The format of a command control block will be explained in greater detail below.

Composite device driver 110 is a similar device driver that converts generic I/O access requests issued by filesystem 107 into device-specific I/O access commands. Specifically, in this embodiment, composite device driver 110 creates a "native request packet" that contains information necessary for accessing a memory location within a composite drive formed by two or more of the SCSI peripheral devices 106-1 through 106-8. This will be better understood from the following.

SCSI peripheral devices 106-1 through 106-8 are each coupled to drive array controller 102 via a SCSI bus. SCSI peripheral devices 106-1 through 106-8 are exemplary of SCSI hard drives, SCSI floppy drives, SCSI CD-ROM units and SCSI tape drives. As stated above, several of the SCSI peripheral devices may be SCSI hard drives that collectively form a composite drive.

Drive array controller 102 includes an AHA emulation interface 120 coupled to AHA device driver 108 and a native interface 122 coupled to composite device driver 110. A pass-through driver 124 couples AHA emulation interface 120 to a SCSI device driver 126. A composite disk driver 128 and a virtual disk driver 130 similarly couple native interface 122 to SCSI device driver 126. The plurality of SCSI peripheral devices 106-1 through 106-8 are shown coupled to SCSI device driver 126. It will be evident from the following that additional SCSI device drivers (i.e., similar to SCSI device driver 126) may be coupled in parallel with SCSI device driver 126 to provide channels to additional SCSI busses to thereby allow connections to additional SCSI peripheral devices.

Upon boot and initialization of the host computer 104, AHA device driver 108 and composite device driver 110 detect the presence of the disk array controller 102 which may be plugged into one of the EISA expansion slots of the host computer. In one embodiment, AHA emulation interface 120 is mapped at a starting address of 0330 and the native interface 122 is mapped at a starting address of 0XC80 (where X is the EISA slot number). Each interface could have a different interrupt value; for example, AHA emulation interface 120 could have an interrupt value of IRQ11 and native interface 122 could have an interface value of IRQ15. AHA emulation interface 120 and native interface 122 respond by providing configuration information which, among other things, indicates the type of SCSI devices connected to drive array controller 102. This "doorbell" polling technique for detecting the presence of peripheral cards and for providing peripheral configuration information to host computer 104 is well known.

Following boot and initialization, when a peripheral access request is generated by filesystem 107 that necessitates access to one of the SCSI peripheral devices 106-x, filesystem 107 determines which of the device drivers 108 or 110 has been designated for driving the particular SCSI device 106-x. It is noted that the device driver 108 or 110 designated to drive a particular SCSI device 106-x is specified during the boot and initialization procedures in accordance with conventional methods.

If the AHA device driver 108 is designated for handling the peripheral access request, the peripheral access request is provided to the AHA device driver 108 from filesystem 107. The AHA device driver 108 responsively creates a command control block which is stored in the local memory of the host computer system.

A typical command control block 200 as created by AHA device 108 is illustrated in FIG. 2. The command control block 200 provides information required to control a SCSI command sequence, and contains pointers to the data area to be used by the command as well as areas for presenting status of both the drive array controller 102 and the addressed SCSI device 106-x. The command control block of FIG. 2 is described in detail within the "AHA-1540A/1542 User's Manual"; Adaptec, Inc.; 1989. This document is incorporated herein by reference in its entirety.

Also embedded within the command control block of FIG. 2 is a SCSI command descriptor block (CDB) 201. The SCSI command descriptor block 201 defines the action to be taken by the addressed SCSI device 106-x. FIG. 3 is a diagram that illustrates the composition of a typical SCSI command descriptor block 201. The command descriptor block 201 is a standard SCSI format command packet transmitted to an addressed SCSI device via the SCSI bus. The command descriptor block 201 contains all the command information required by a SCSI device to perform a desired operation. The particular form of the command descriptor block is specified by SCSI committee standards and is described in detail within the SCSI specification ANSI x3.131.

Referring back to FIG. 1, after the AHA device driver 108 creates the command control block in accordance with the format of FIG. 2 and stores it in the local memory of the host computer, the AHA device driver 108 writes at I/O address 0331 (base address+1) an operation code "02" which causes the AHA emulation interface to start a SCSI operation. The AHA emulation interface 120 next transfers the command control block created by AHA device driver 108 to a separate memory unit provided on the drive array controller card, and determines whether the command control block is targeted to a stand-alone SCSI device or to a composite drive. If virtual device mapping is employed, the AHA emulation interface 120 further translates the virtual address of the SCSI target device to a corresponding physical address for the SCSI target device.

If the command control block is targeted to a stand-alone SCSI device, it is provided to pass-through driver 124. Pass-through driver 124 accordingly extracts the SCSI command descriptor block (i.e., of FIG. 3) embedded within the command control block. The SCSI command descriptor block is then provided to SCSI device driver 126 which accordingly passes the SCSI command descriptor block to the targeted SCSI device via the SCSI bus. The SCSI device 106-x thereafter effectuates the desired access operation in accordance with the SCSI command descriptor block.

If the AHA emulation interface 120 instead determines that the command control block is targeted to a composite drive, the command control block is provided to composite disk driver 128 which determines the particular SCSI drive as well as the sector address on that drive which correspond to the composite address specified within the command control block. The composite disk driver 128 accordingly provides a virtual drive control block that contains the translated virtual drive location and sector address information to virtual disk driver 130.

Virtual disk driver 130 is provided to accommodate a data redundancy technique known as data mirroring. Generally speaking, data mirroring essentially provides a redundant (or "mirror") data drive for each primary data drive. A write to a composite drive that implements data mirroring results internally to a write to the primary data drive and a write to its mirror drive. If a failure in one of the primary data drives occurs, the system can access the redundant data in the corresponding mirror drive until the failed drive has been replaced.

When the virtual drive control block is provided to virtual disk driver 130, the virtual disk driver 130 creates a physical drive control block that contains information needed to access the mirror drive. The physical drive control block is accordingly provided to SCSI device driver 126. SCSI device driver 126 then creates a command descriptor block (i.e., according to the format of FIG. 3) using the information contained within the physical drive control block and accordingly provides the resulting SCSI command descriptor block to the appropriate SCSI device 106-x. The SCSI device 106-x responsively effectuates the desired access operation. Virtual disk driver 130 creates a similar physical control block for the physical drive which is a mirror of the first and provides it to SCSI device driver 126.

Although composite drive requests can be provided to a composite drive through AHA device driver 108 as described above, it is typically preferable to access the composite drive through composite device driver 110. The reason for this is as follows. Since the composite drive consists of a plurality of hard drives coupled in parallel, it is possible for several composite drive requests to be serviced simultaneously if the requests correspond to physical sectors on separate hard drives of the composite drive. That is, when one of the hard drives is accessing a particular sector to service one request, another hard drive could service a subsequent request simultaneously. Composite device driver 110 is advantageously configured to allow several of the hard drives forming a composite drive to service requests simultaneously. The AHA device driver 108, on the other hand, assumes stand-alone SCSI devices and is not capable of generating enough requests to keep more than one of the hard drives of a composite drive busy.

Accordingly, when an operating system I/O access request is provided from filesystem 107 to composite device driver 110, composite device driver 110 provides a "native command" to the native interface 122. The native command provided from composite device driver 110 is a block of information that instructs the drive array controller 102 of the type of access desired, the starting composite address and the transfer length. As broadly defined, a native command is any composite drive access command that does not contain a SCSI command descriptor block. When the native interface 122 receives the native command, it creates a composite command block which is provided to composite disk driver 128. Similar to the previous description, composite disk driver 128 then determines the physical drive as well as the sector location on that drive which correspond to the composite drive location for which access is sought. The composite disk driver 128 then creates a virtual drive control block that contains the virtual drive location and provides it to virtual disk driver 130, which creates a corresponding physical drive control block. The physical drive control block is then provided to the SCSI device driver 126 along with, if data mirroring is implemented, a second corresponding physical drive control block. The SCSI device driver 126 accordingly converts the physical drive control block (or blocks) to a SCSI command descriptor block and provides the command descriptor block to the appropriate SCSI device 106-x via the SCSI bus.

The drive array controller 102 as depicted by the functional diagram of FIG. 1 therefore provides an interface between a host expansion bus and a plurality of SCSI peripheral devices. Two or more of the SCSI peripheral devices are SCSI hard drives that collectively form a composite drive. The remaining SCSI peripheral devices, if any, are stand-alone SCSI devices. The SCSI peripheral devices may be driven through a first device driver (i.e., AHA device driver 108) that provides a peripheral access command having a SCSI command descriptor block embedded therein. SCSI hard drives that form a composite drive may be alternatively driven through a second device driver (i.e., composite device driver 110) that provides non-SCSI composite drive access commands. Since the second device driver is adapted to allow several hard drives within the composite drive to service requests concurrently, good overall system performance results. Furthermore, since the AHA emulation interface 120 is provided, stand-alone SCSI devices are also accommodated by drive array controller 102 without requiring an additional peripheral card which would occupy an additional I/O expansion slot of the host computer.

Referring now to 4, a hardware block diagram is shown of a drive array controller 102 according to one embodiment of the present invention. The drive array controller 102 includes a bus master interface controller (BMIC) 402, preferably the 82355 from Intel, coupled to an EISA bus 403. The BMIC 402 is a highly integrated bus master designed for use in 32 bit EISA bus master expansion cards and is used to interface between the drive array controller 102 and the EISA bus 403. Further details regarding the operation of the BMIC 404 are provided within the Intel Peripheral Components manual, 1993 edition, which is incorporated herein by reference in its entirety.

The BMIC 202 is coupled through a 16 bit bus 405 (referred to as the TBus) to a BMIC extender 406 as shown. The BMIC extender 406 is a bus bridge that acts as a buffer to transfer data between a high speed 32 bit bus 407 (referred to as the XBus) and the 16 bit bus 405. The BMIC 402 is also coupled to the BMIC extender 406 through a bus referred to as a BBus 410. Also coupled to the BBus 410 are various miscellaneous devices 412, a serial port 414, a timer 416, preferably the 82C54 from Intel Corporation, 8 kilobytes of non-volatile RAM 418, and 256 kilobytes of flash memory 420. The miscellaneous devices 412 may include, for example, a universal asynchronous receiver/transmitter (UART), among other devices. The serial port 414 is preferably used for connecting the drive array controller 102 to a secondary computer system or other devices. The timer 116 is used for conventional timing functions. The non-volatile RAM 218 is used for storage of controller configuration information. The 256 kilobytes of flash ROM is used to store boot code, power on self test (POST code), initialization code, debugger code, compressed i960 CA code, compressed SCSI script code, and compressed option ROM code. The compressed code items referenced above are decompressed and moved to their normal operating locations at boot time.

The drive array controller 102 further includes sixteen kilobytes of option RAM 430 and an AHA emulation chip 432 coupled between the EISA bus 403 and the BBus 410. The BMIC extender 406 is coupled through the 32 bit XBUS 407 to a pair of peripheral device interface processors 436 and 438. The processors 436 and 438 are referred to as SCSI processors in the remainder of this description for simplicity. In the preferred embodiment, the SCSI processors 436 and 438 are NCR53C710 SCSI processors. Each NCR53C710 processor internally includes a rudimentary RISC processor which operates by executing blocks of code referred to as scripts, which are similar to assembly code. Further details regarding the operation of the NCR53C710 SCSI I/O processor are provided within the NCR53C710 Programmer's Guide, Data Manual, and Electrical Specifications Manual, published by NCR corporation, which are incorporated herein by reference in their entirety. It is noted that an NCR53C720 SCSI processor could be alternatively be used.

Each of the SCSI processors 436 and 438 include a corresponding SCSI bus referred to as SCSI bus A and SCSI bus B respectively. A plurality of SCSI devices may be coupled to each of the SCSI buses A and B. As stated previously, each SCSI bus can accommodate up to eight SCSI peripheral devices.

A one megabyte static random access memory (SRAM) unit 440 is shown coupled to XBus 407. The XBus 407 is coupled through a bus bridge 442 to a bus referred to as the GBus 444. The GBus is a 32 bit bus which connects to a local processor 446, preferably the i960 processor produced by Intel, and 0.5 Megabytes of SRAM 448. Another bus bridge 450 is finally shown coupled between GBus 444 and BBus 410.

As stated previously with reference to FIG. 1, the drive array controller 102 includes two modes of operation. The first mode, referred to as native mode, is a high performance mode designed for use on platforms which include device drivers written to drive a composite drive and which thus attain increased performance. The platforms which currently have device drivers for this mode in the preferred embodiment include Novell Netware 386, SCO UNIX, Windows NT, and OS/2, among others. The second mode of operation is referred to as AHA emulation mode, which causes the drive array controller 102 to emulate an Adaptec AHA-1540 controller. As is well known in the art, the Adaptec 1540 uses a standard SCSI control system referred to as the Advanced SCSI Programming Interface (ASPI). Thus the AHA emulation chip 140 allows the drive array controller 200 to operate on platforms which include device drivers written generally for the Adaptec 1540.

A native mode request, referred to previously as a native mode request packet, is provided to drive array controller 102 by writing several registers within BMIC 402. The native mode request packet is then written into SRAM 448. The functional blocks of FIG. 1 including the native interface 122, composite disk driver 128 and virtual disk driver 130 are embodied by software routines executed by local processor 446. When the virtual disk driver subroutine completes, a SCSI command descriptor block is created by the SCSI device driver 126 for one of SCSI processors 436 or 438 and is accordingly provided to a target SCSI device residing on one of SCSI buses A or B.

An AHA emulation mode request, referred to previously as a command control block, is provided to drive array controller 102 through AHA emulation chip 432. When the AHA device driver (i.e., driver 108 of FIG. 1) creates a command control block, the local processor 446 using the BMIC 402 transfers the command control block into SRAM 448. The functional blocks of FIG. 1 including AHA emulation interface 120 and pass-through driver 124 are embodied by software executed by local processor 446. Once an appropriate SCSI command descriptor block has been obtained, it is provided to the target SCSI device through either SCSI processor 436 or 438.

Figure 4:
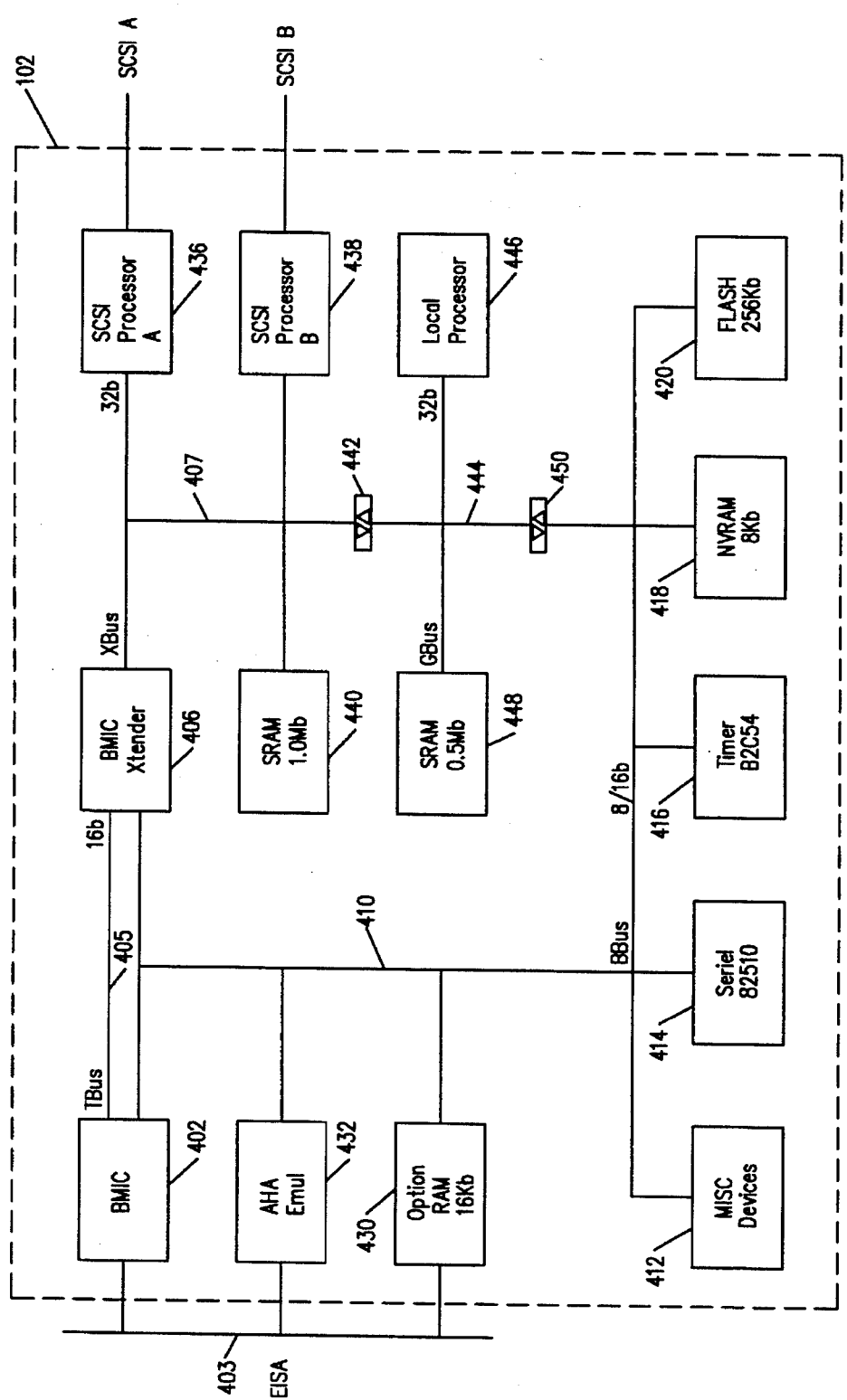
FIG. 4 is a hardware block diagram of a drive array controller according to one embodiment of the present invention.
Figure 5A:
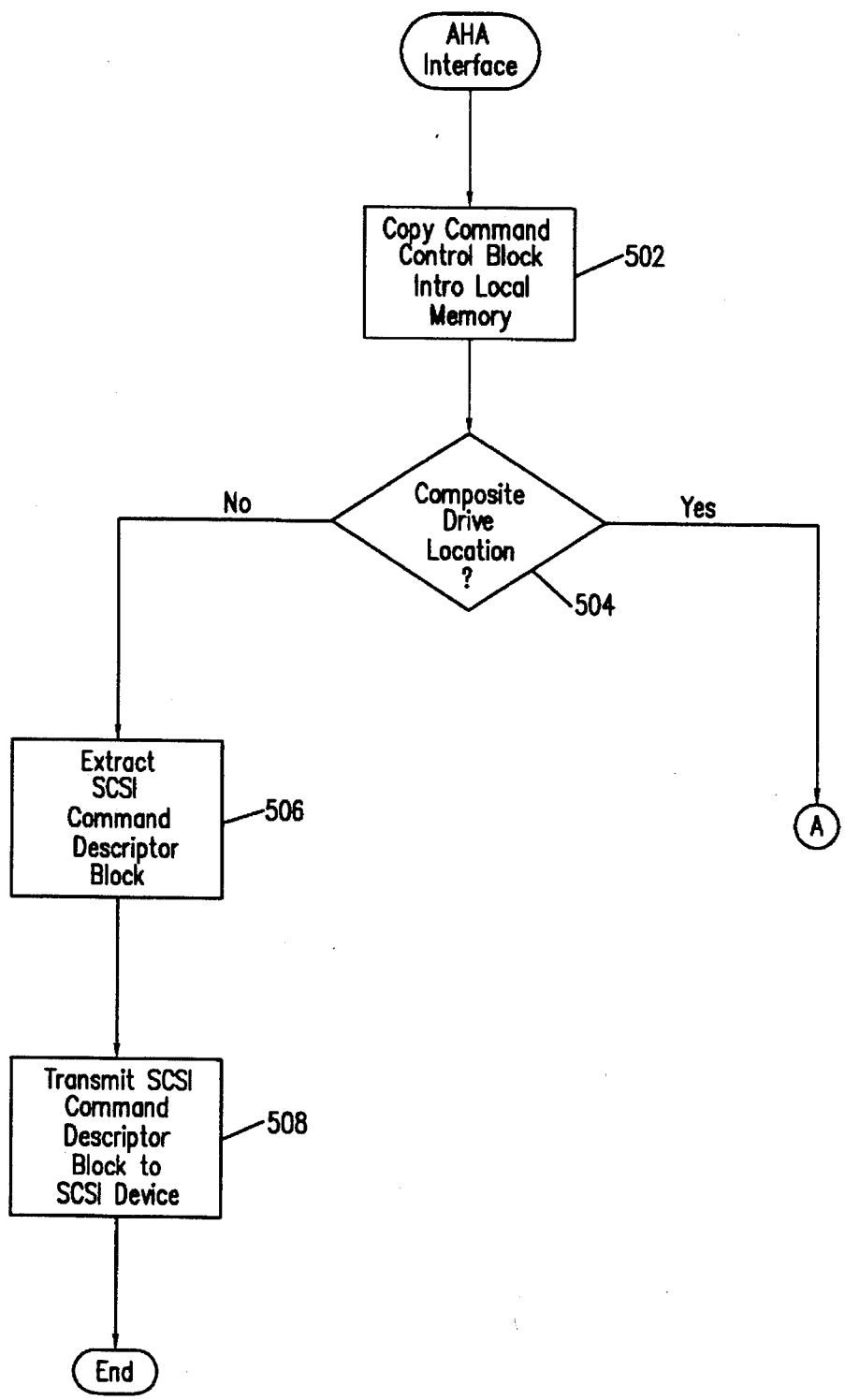
FIGS. 5A–5C are flow diagrams that illustrate software routines executed by a drive array controller according to the present invention.
Figure 5B:
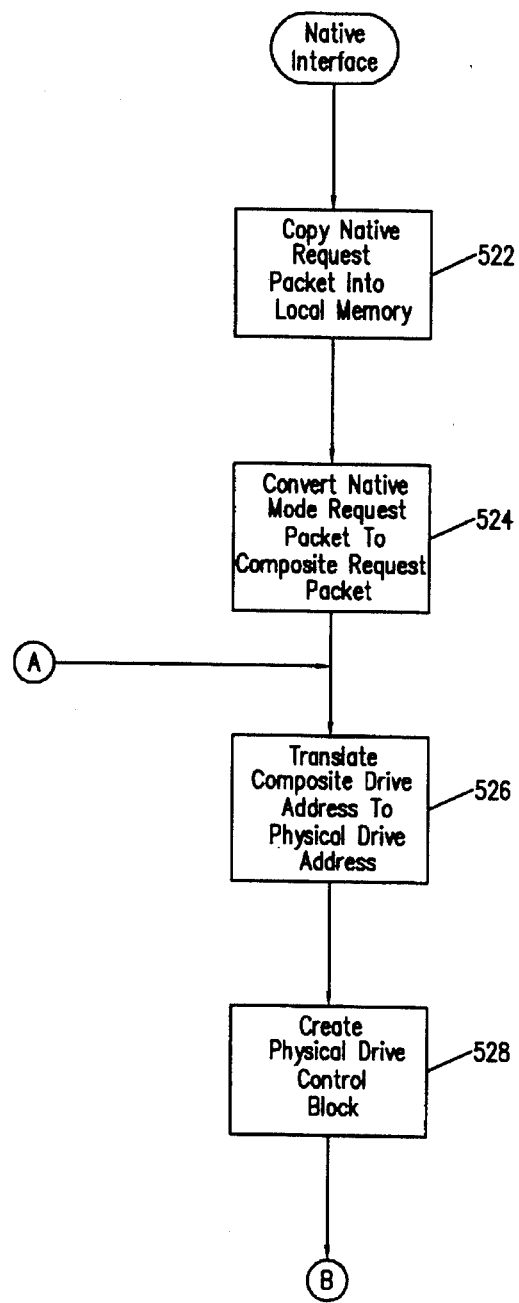
Figure 5C:
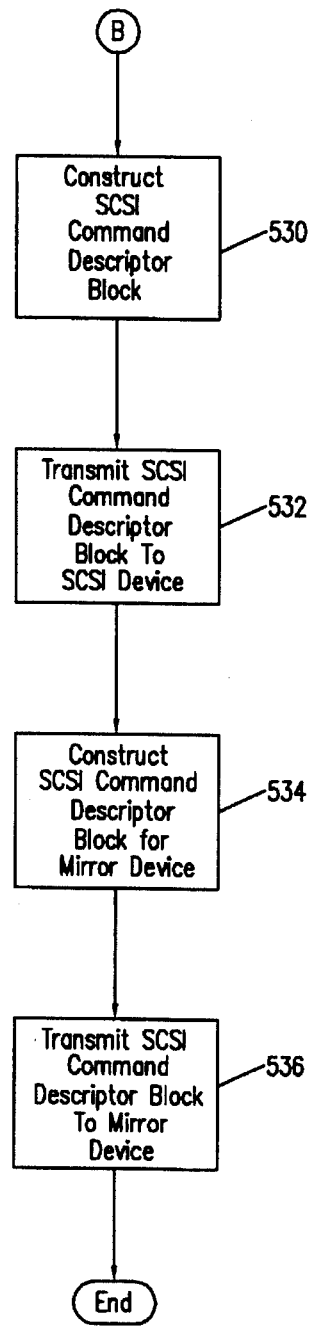

Referring next to FIGS. 5A–5C, a flow diagram is shown that illustrates the software routines executed by peripheral processor 446 and the SCSI processors 436 and 438. Referring first to FIG. 5A in conjunction with FIGS. 1 and 4, when a peripheral access request is issued by AHA device driver 108, the AHA emulation interface 120 copies the command control block into the local memory (i.e., SRAM 448) of local processor 446 during step 502. The AHA emulation interface 120 then determines whether the command control block corresponds to a composite drive location during step 504. If the command control block does not correspond to a composite drive location, pass-through driver 124 extracts the SCSI command descriptor block from the command control block during step 506 and the SCSI device driver 126 transmits the SCSI command descriptor block to the target SCSI device 106-x during step 508. It is noted that the portion of the flow diagram depicted by step 508 is executed by software executed by one of the SCSI processors.

If the command control block corresponds to a composite drive location then, referring to FIG. 5B, the composite drive address within the command control block is translated to a physical drive address during step 526. Composite disk driver 128 performs the translation depicted by step 526. During step 528, a physical drive control block is created for the mirrored drive if data mirroring is implemented. Referring next to FIG. 5C, a SCSI command descriptor block is constructed during step 530, and is transmitted to the targeted SCSI device 106-x during step 532. A SCSI command descriptor block is next constructed for the mirror device during step 534, and is transmitted to the mirror SCSI device during step 536.

Referring back to FIG. 5B, when a native mode access request is provided from composite device driver 110 to the native interface 122, a copy of the native request packet is stored within the local memory (i.e., SRAM 448) of the drive array controller 102 during step 522. During step 524, the native mode request packet is converted to a composite request packet. The composite drive address within the composite request packet is then translated to a virtual drive address during 526, and an appropriate physical drive control block is constructed during step 528. Referring to FIG. 5C, a SCSI command descriptor block is next constructed during step 530 and is transmitted to the target SCSI device 106-x during step 532. A SCSI command descriptor block is constructed for the mirror drive during step 534 and is transmitted to the mirror drive during step 536.

Additional details regarding the exemplary hardware configuration of FIG. 4 are described within the commonly assigned, co-pending applications entitled "System and Method For Selective Write-back Caching Within A Disk Array Subsystem" Ser. No. 08/144,118 (now pending) filed Oct. 27, 1993 "Method For Configuring A Composite Drive For A Disk Drive Array Controller" filed Sep. 30, 1993; "Muliple Function Interface Device For Option Card" Ser. No. 08/092,044, (now pending) filed Jul. 15, 1993; "DMA Controller Having Address Generation Circuitry For Performing Memory Allocation and A Computer System Incorporating The Same" filed Oct. 6, 1993; "Multi-Purpose Usage of Transaction Backoff and BuS Architecture Supporting The Same" Ser. No 08/104,225, filed Aug. 10, 1993; and "Burst Wait State Generator" Ser. No 08/102,449, (now pending) filed Aug. 5, 1993. These applications are incorporated herein by reference in their entirety.

Numerous variations and modifications will become apparent to those skilled in the art once the above disclosure is fully appreciated. It is intended that the following claims be interpreted to embrace all such variations and modifications.

What is claimed is:

1. A drive array controller connectable to a host computer, wherein the host computer includes a first device driver configured to generate a peripheral access request having a SCSI command descriptor block embedded therein and a second device driver configured to generate a composite drive access request, said drive array controller comprising:

a first request interface coupled to receive said peripheral access request from said first device driver;

a pass-through driver coupled to said first request interface, wherein said pass-through driver is configured to extract said SCSI command descriptor block from said peripheral access request;

a second request interface coupled to receive said composite drive access request from said second device driver and configured to generate a composite command block containing information for accessing a composite drive;

a composite disk driver coupled to said second request interface and configured to translate a composite drive location indicated within said composite command block to a physical drive location, wherein said composite disk driver is further configured to provide the physical drive location within a physical drive control block;

a SCSI device driver coupled to receive said SCSI command descriptor block from said pass-through driver and configured to provide said SCSI command descriptor block to a SCSI bus having a plurality of SCSI peripherals coupled thereto during a first mode, and wherein said SCSI device driver is further coupled to receive said physical drive control block and is configured to derive a separate SCSI command descriptor block from said physical drive control block and is configured to provide said separate SCSI command descriptor block to said SCSI bus during a second mode; and a virtual disk driver configured to generate a command block containing information for storing redundant data within said composite drive and coupled to provide said command block to said SCSI device driver.

2. The drive array controller as recited in claim 1 wherein said first request interface is an AHA emulation interface configured to receive an AHA command control block.

3. The drive array controller as recited in claim 2 wherein said second request interface is a native interface configured to receive composite drive command information from said second device driver.

4. The drive array controller as recited in claim 1 wherein said first device driver is an AHA device driver.

5. The drive array controller as recited in claim 4 wherein said second device driver is a composite device driver.

6. The drive array controller as recited in claim 1 wherein said composite disk driver is further coupled to said first request interface and is configured to translate a composite drive location indicated within said peripheral access request to a physical drive location.

7. The drive array controller as recited in claim 6 wherein said first request interface is configured to determine whether said peripheral access request corresponds to a composite drive or to a stand-alone SCSI device.

8. The drive array controller as recited in claim 1 wherein said plurality of SCSI peripherals connected to said SCSI bus form a composite drive.

9. The drive array controller as recited in claim 1 wherein said first request interface and said second request interface are coupled to said first device driver and to said second device driver, respectively, through an EISA expansion bus.

10. The drive array controller as recited in claim 1 wherein said pass-through driver and said composite disk driver are embodied by software routines executed on a local processor.

11. The drive array controller as recited in claim 10 wherein said second request interface is partially embodied by a bus master interface chip.

12. The drive array controller as recited in claim 11 wherein said SCSI device driver is partially embodied by a software routine executed on a SCSI processor.

13. The drive array controller as recited in claim 1 wherein said first request interface is configured to translate a virtual SCSI address to a physical SCSI address.

14. A method for interfacing a plurality of SCSI devices to a host computer system comprising the steps of:

receiving a peripheral access request having a SCSI command descriptor block embedded therein at a first request interface through an expansion slot of said host computer system;

extracting said SCSI command descriptor block from said peripheral access request;

providing said SCSI command descriptor block to a SCSI bus;

receiving a composite drive access request at a second request interface through said expansion slot of said host computer system;

translating a composite drive location indicated within said composite drive access request to a physical drive location to thereby create a physical drive command request;

converting said physical drive command request to a second SCSI command descriptor block;

providing said second SCSI command descriptor block to said SCSI bus; and creating a control block corresponding to said composite drive access request, wherein said control block is for storing redundant data.

* * * * *